UNITED STATES PATENT OFFICE.

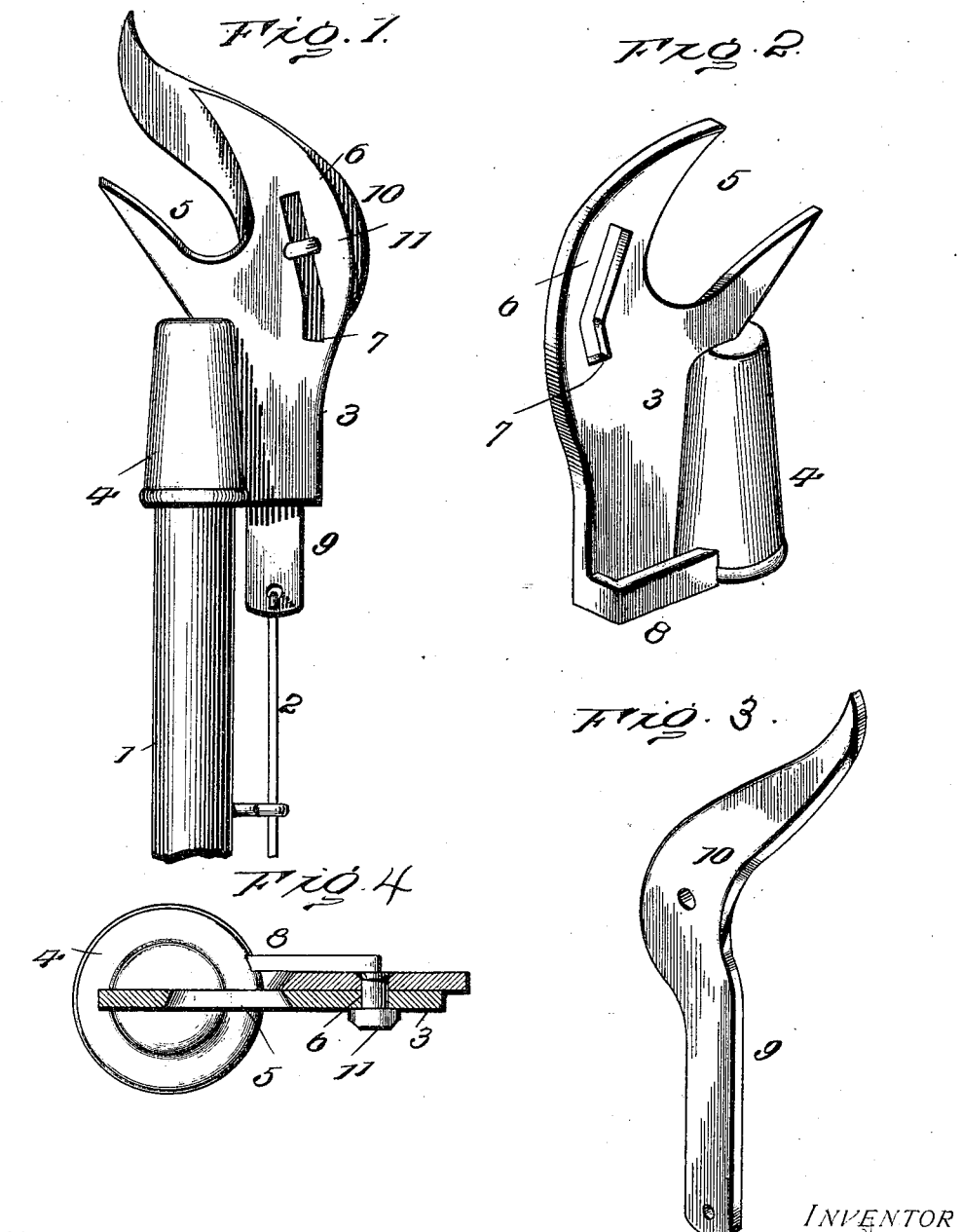

RILEY ALBACH, OF MOUNT GILEAD, OHIO.

PRUNING IMPLEMENT.

SPECIFICATION forming part of Letters Patent No. 662,052, dated November 20, 1900.

Application filed April 4, 1900. Serial No. 11,505. (No model.)

*To all whom it may concern:*

Be it known that I, RILEY ALBACH, a citizen of the United States, residing at Mount Gilead, in the county of Morrow and State of Ohio, have invented certain new and useful Improvements in Pruning Implements; and I do hereby declare the following to be a full, clear, and exact description of the invention, such as will enable others skilled in the art to which it appertains to make and use the same.

This invention has relation to pruning implements of the variety having the cutting mechanism carried on the end of a pole and operable from the ground, the purpose being the provision of an effective device of as light weight as possible consistent with strength to operate by a draw cut, to centralize the strain to avoid springing of the pole when in use, to cut from above to take advantage of the weight of the branch in easing the blade, and which will be free from parts at the head to avoid cutting into branches and hindering the free use of the implement.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment thereof is illustrated in the accompanying drawings, in which—

Figure 1 is a side elevation of a pruning implement embodying the invention. Fig. 2 is a perspective view of the socket and fixed blade. Fig. 3 is a perspective view of the movable or sickle blade. Fig. 4 is a transverse section.

Corresponding and like parts are referred to in the following description and indicated in all the views of the drawings by the same reference characters.

In common with devices of this class the implement comprises a pole 1 of suitable length, cutting mechanism at the upper end of the pole, and a stout wire or rod 2, extending alongside the pole and confined thereto by keepers and having its upper end attached to the movable part of the cutting mechanism and its lower end connected to an operating-lever or analogous device, (not shown,) by means of which the cutting mechanism is actuated—*i. e.*, opened and closed—when the device is in operation.

The cutting mechanism, which forms the essential part of this invention, comprises a fixed plate 3, attached to the pole 1, preferably by means of a socket 4, formed therewith. The plate 3 is provided in its upper portion with a diagonal slot 5 to receive the branch or other part to be lopped off. Near one edge the plate is provided with a guide-slot, whose upper portion 6 is inclined and lower portion 7 straight. A keeper 8 is provided at the base of the socket 4 and plate 3 and receives the shank 9 of the sickle-blade 10. The parts 3, 4, and 8 are preferably malleable cast, and the lower edge of the slot 5 is beveled to provide an approximately chisel edge adjacent to the plane of the sickle-blade 10 to facilitate the cutting action of the implement. The blade 10 is formed of tool-steel highly tempered and is curved, approximating the form of a sickle in outline, and its shank 9 is straight and passes through the keeper 8. A headed fastening 11 passes through the slot 6 7 and is secured to the blade 10 and acts in conjunction with the keeper 8 to hold the blade 10 close against the plate 3. The headed fastening 11 also serves to direct the blade 10 in its reciprocating movements and effects a draw cut when operating in the inclined portion 6 of the guide-slot. The shank 9 has sufficient play in the keeper 8 to admit of the lateral movements of the blade 10 incident to the fastening 11, operating in the inclined portion 6 of the guide-slot. The keeper 8 in addition to its function of guiding the blade 10 and holding the latter to the plate 3 braces said plate and strengthens the juncture thereof with the socket 4 at the point where the greatest strain is imposed when the implement is in operation. The parts are so related and proportioned that the strain comes about in line with the center of the pole 1. Hence the latter is prevented from springing when pulling upon the blade 10 to force it through the branch or part to be cut. The operating wire or rod 2 is attached at its upper end to the shank 9 and when drawn upon causes the blade 10 to descend and cut through the branch received in the slot 5. It will be observed that the blade cuts from the top side of the branch downward. Hence advantage is taken of the weight of the branch in easing the blade and preventing binding thereof when the implement is in service. The blade 10 is operated in the usual manner by the handle (not shown) applied to the pole, the movement imparted to the wire 2 being transmitted to the blade, which is reciprocated vertically thereby. The blade receives a lateral movement simultaneous with the vertical movements by reason of the fastening 11, running in the said inclined portion 6. When the said fastening 11 operates in the straight portion 7 of the slot, the blade moves in vertical lines, and this takes place at the initial downstroke and the final upstroke of the blade.

Having thus described the invention, what is claimed as new is—

In a pruning implement, a plate having a socket at the lower portion of one of its edges, an integral keeper at the lower end of its opposite edge and bracing the said plate and socket, an oblique branch-receiving slot in the edge portion above the socket, and having a guide-slot in the edge portion opposite the said branch-receiving slot and consisting of an upper inclined portion and a lower straight portion, a curved blade having a straight shank passed through the aforesaid keeper, and a headed fastening attached to the blade and passed through the guide-slot of the plate, substantially as and for the purpose described.

In testimony whereof I affix my signature in presence of two witnesses.

RILEY ALBACH. [L. S.]

Witnesses:
W. D. MATHEWS,
LIDA BOWEN.